US006367929B1

(12) United States Patent
Maiden et al.

(10) Patent No.: US 6,367,929 B1
(45) Date of Patent: Apr. 9, 2002

(54) HYDROGEL WITH INTERNAL WETTING AGENT

(75) Inventors: Annie C. Maiden; Douglas G. Vanderlaan; David C. Turner; Robert N. Love, all of Jacksonville; James D. Ford; Frank F. Molock, both of Orange Park; Robert B. Steffen, Jacksonville Beach; Gregory A. Hill, Atlantic Beach; Azaam Alli; Kevin P. McCabe, both of Jacksonville, all of FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/533,062

(22) Filed: Mar. 22, 2000

Related U.S. Application Data

(63) Continuation-in-part of application No. 09/414,365, filed on Oct. 7, 1999, which is a continuation-in-part of application No. 09/033,347, filed on Mar. 2, 1998, now Pat. No. 5,998,498.

(51) Int. Cl.$^7$ ................................................. G02C 7/04
(52) U.S. Cl. .................. 351/160 H; 523/106; 523/107; 524/858; 524/865; 525/165; 525/279; 525/431; 526/279; 528/25; 528/32
(58) Field of Search ..................... 351/160 H; 526/279, 526/201, 215; 523/106, 107; 525/431; 524/865, 858; 528/25, 32, 41, 165, 178, 279

(56) References Cited

U.S. PATENT DOCUMENTS

| 3,808,178 A | 4/1974 | Gaylord |
| 4,042,552 A | 8/1977 | Grucza |
| 4,045,547 A | 8/1977 | Le Boeuf et al. |
| 4,495,313 A | 1/1985 | Larsen |
| 4,678,838 A | 7/1987 | Janssen |
| 4,703,097 A | 10/1987 | Wingler et al. |
| 4,786,657 A | 11/1988 | Hammar et al. |
| 4,791,175 A | 12/1988 | Janssen |

(List continued on next page.)

FOREIGN PATENT DOCUMENTS

| EP | 080539 | 6/1983 |
| EP | 0 328 340 B1 | 8/1989 |
| EP | 0 338 656 B1 | 10/1989 |
| EP | 396364 | 11/1990 |
| EP | 908744 | 4/1999 |
| EP | 0 940 693 | 9/1999 |
| JP | 61-123609 | 6/1986 |
| JP | WO 91/10155 | 7/1991 |
| WO | WO 92/07013 | 4/1992 |
| WO | WO 92/09639 | 6/1992 |
| WO | WO 93/05085 | 3/1993 |
| WO | WO 93/05098 | 3/1993 |
| WO | WO 93/09154 | 5/1993 |
| WO | WO 93/23774 | 11/1993 |
| WO | WO 96/31792 | 10/1996 |
| WO | WO 97/05185 | 2/1997 |
| WO | WO 97/20851 | 6/1997 |
| WO | WO 97/20852 | 6/1997 |

OTHER PUBLICATIONS

Y. LAI, "The Role of Bulky Polysiloxanyalkyl Metchacrylates in Polyurethane–Polysiloxane Hydrogels" J. of Appl. Poly. Sci., vol. 60, 1193–1199 (1996).

Y. LAI, "The Role of Polysiloxanylalkyl Methacrylates in Oxygen–Permeable Hydrogel Materials,". Appl. Poly Sci., vol. 56, 317–324 (1995).

76$^{th}$ Annual Southern Educational Congress of Optometry—New Developments in Product Chemistry for Continuous Wear, 99093–1542 Tape 2 (Stenographer's Certificate Dated Aug. 27, 1999).

D. Martin and B. Holder, "Forces Developed Beneath Hydrogel Contact Lenses Due to Squeeze Pressure" Phys. Med. Biol., 1986 vol. 30, No. 6, 635–649.

P. Gerry, "Bilateral Superior Epithelial Arcuate Lesions; A Case Report" Clinical and Experimental Optometry, Accepted for Publication Aug. 6, 1995 (Clin Ext Optom 1995; 78: 5: 194–195).

Contact Lens Monthly, Nov. 6, 1996, No. 5676 vol. 216 "Superior Epithelia Arcuate Lesions (Seal) Epithelial Splitting".

Contact Lens Month, May 5, 1995, No. 5500 "Photofile Part Three Superior Epithelia Arcuate Lesions".

H.D. Conway et al., "The Effects of Contact Lens Deformation on Tear Film Pressure and Thickness during Motion of the Lens Towards the Eye", Journal of Biomechanical Engineering, vol. 105, 47–50 (1983).

Tanabe Yukio, Abstract of "A Case of Dry Eye with Bilaterial Superior Epithelial Arcuate Lesion", Abstract of DialogMed Document, File No. Accession No. 1153091.

Kunzler J F: "Silicone Hydrogels for Contact Lens Application" Trends in Polymer Science, NL, Elsevier Science Publishers B.V. Amsterdam. vol. 4, No. 2, Feb. 1, 1996, pp. 52–59.

Johnson & Johnson Vision Care, Inc. USSN 09/414,365 Patent Pending.

Johnson & Johnson Vision Care, Inc. USSN 09/532,943 Patent Pending.

Johnson & Johnson Vision Care, Inc. USSN 09/652,817.

Abstract, Oct. 6, 1999, Fluid–activated electrochemical sensor for gas in fluids. Dickens, Robert Andrew; Scott, Ian Lawrence; Kratochivil, Jiri (BOC Group PLC, UK). Brit. UK Pat. Appl. (1988) GB 2204138.

Primary Examiner—Robert Dawson
Assistant Examiner—Marc S. Zimmer
(74) Attorney, Agent, or Firm—Todd Volyn

(57) ABSTRACT

A wettable silicone hydrogel made by including a high molecular weight hydrophilic polymer into the silicone hydrogel monomer mix is presented. The hydrophilic polymer is entrapped in the hydrogel with little or no covalent bonding between it and the hydrogel matrix.

32 Claims, No Drawings

U.S. PATENT DOCUMENTS

| | | |
|---|---|---|
| 4,833,196 A | 5/1989 | Janssen |
| 4,889,664 A | 12/1989 | Kindt-Larsen et al. |
| 4,954,586 A | 9/1990 | Toyoshima et al. |
| 4,954,587 A | 9/1990 | Mueller |
| 5,010,141 A | 4/1991 | Mueller |
| 5,034,461 A | 7/1991 | Lei et al. |
| 5,039,459 A | 8/1991 | Kindt-Larsen et al. |
| 5,057,578 A | 10/1991 | Spninelli |
| 5,079,319 A | 1/1992 | Mueller |
| 5,115,056 A | 5/1992 | Mueller et al. |
| 5,135,297 A | 8/1992 | Valint, Jr. |
| 5,198,477 A | 3/1993 | von der Haegen et al. |
| 5,219,965 A | 6/1993 | Valint, Jr. et al. |
| 5,260,000 A | 11/1993 | Nandu et al. |
| 5,314,960 A | 5/1994 | Spinelli et al. |
| 5,336,797 A | 8/1994 | McGee et al. |
| 5,352,714 A | 10/1994 | Lai et al. |
| 5,358,995 A | 10/1994 | Lai et al. |
| 5,364,918 A | 11/1994 | Valint, Jr. et al. |
| 5,371,147 A | 12/1994 | Spinelli |
| 5,387,632 A | 2/1995 | Lai et al. |
| 5,387,662 A | 2/1995 | Kunzler et al. |
| 5,401,508 A | 3/1995 | Manesis |
| 5,451,617 A | 9/1995 | Lai et al. |
| 5,486,579 A | 1/1996 | Lai et al. |
| 5,525,691 A | 6/1996 | Valint, Jr. et al. |
| 5,534,605 A | 7/1996 | Bambury et al. |
| 5,539,016 A | 7/1996 | Kunzler et al. |
| 5,710,302 A | 1/1998 | Kunzler et al. |
| 5,908,906 A | 6/1999 | Kunzler et al. |
| 5,959,117 A | 9/1999 | Ozark et al. |
| 5,998,498 A | 12/1999 | Vanderlaan et al. |
| 6,099,852 A * | 8/2000 | Jen |

\* cited by examiner

HYDROGEL WITH INTERNAL WETTING AGENT

This application is a continuation-in-part of U.S. Ser. No. 09/414,365 which was filed on Oct. 7, 1999, which is a continuation-in-part of U.S. Ser. No. 09/033,347, which was filed on Mar. 2, 1998 and has now issued as U.S. Pat. No. 5,998,498.

BACKGROUND OF THE INVENTION

This invention relates to hydrophobic polymers. More particularly, it relates to hydrophobic polymers which, when prepared with an internal wetting agent, are suitable for use in biomedical devices such as ophthalmic lenses.

The suitability of a material for use in biomedical devices depends on a number of factors that often include the wettability of the material and its proclivity for adhesion or reaction with biological materials such as proteins and lipids. In ophthalmic applications such as contact lenses and intraocular implants, oxygen permeability is also an important consideration. High oxygen permeability is generally desirable as is good wettability and resistance to adhesion or reaction with biomaterials.

Silicone hydrogels can be a particularly desirable material for making biomedical devices such as contact lenses because of their generally high oxygen permeability. However, their hydrophobic nature make the devices made from them difficult to wet. One approach for dealing with this problem is to coat the hydrogels with a more hydrophilic coating. This adds an additional level of complexity to their manufacture. Additionally, coating material selection can be difficult as can the determination of proper coating thickness, coating uniformity and other factors that can affect physiological performance.

U.S. Pat. No. 5,219,965 and its progeny propose modifying the surface properties of polymeric objects such as contact lenses by the inclusion of macromers having a hydrophobic portion, a hydrophilic portion, a chain transfer agent, and an unsaturated end group in the monomer mix used to make the objects. The macromers can include poly-N-vinylpyrrolidone having molecular weights of 500–10,000 with 1,000–5,000 being most preferred. The macromers are polymerized into the hydrogel and do improve wettability of the polymers. However, the improvement is generally not to such a degree that lenses can be made from the hydrogels without the need for a hydrophilic coating. In any event, enhancing the wettabillty of biomedical devices such as contact lenses without the need for lens coating would be considered a significant advance in the art.

U.S. Pat. Nos. 4,045,547 and 4,042,552 propose the polymerization of large amounts (14.25–35% wt) of polyvinylpyrrolidone (PVP) into a poly(hydroxyethyl methacrylate) (HEMA) based contact lens formulation. The polymerizations are conducted without regard for the presence of water. No mention is made of the molecular weight of the PVP.

U.S. Pat. Nos. 4,833,196; 4,791,175; and 4,678,838 are directed to the incorporation of poly-N-vinyl lactams into polymers used to make contact lenses. Polyvinylpyrrolidone (PVP) is the preferred polylactam Low molecular weight (~40,000 daltons) PVP is covalently bonded with the monomers used to form the lens by first hydroperoxidizing the PVP by reaction with ozone and then polymerizing the PVP with the other monomers.

U.S. Pat. No. 5,198,477 employs low molecular weight (~25,000 daltons) PVP within an interpenetrating polymer network formed principally from macrocycles made from vinyl containing monomers. The PVP appears to be crosslinked into the interpenetrating network.

SUMMARY OF THE INVENTION

The invention is a wettable silicone hydrogel made by including a high molecular weight hydrophilic polymer into the silicone hydrogel monomer mix. The hydrophilic polymer is entrapped in the hydrogel with little or no covalent bonding between it and the hydrogel matrix.

In one aspect of the invention, the high molecular weight hydrophilic polymer is entrapped in the silicone hydrogel matrix.

In another aspect of the invention, the high molecular weight hydrophilic polymer is a polyvinylpyrrolidone.

In yet another aspect of the invention, high molecular weight hydrophilic polymer has a molecular weight (Mw) of 100,000 to 500,000 daltons; preferably, the molecular weight is at least about 300,000 daltons.

In yet a further aspect of the invention, ophthalmic lenses are made from the silicone hydrogels of this invention.

DETAILED DESCRIPTION OF THE INVENTION

The term "monomer" used herein refers to low molecular weight compounds (i.e. typically having number average molecular weights less than 700) that can be polymerized, and to medium to high molecular weight compounds or polymers, sometimes referred to as macromonomers, (i.e. typically having number average molecular weights greater than 700) containing functional groups capable of further polymerization. Thus, it is understood that the terms "silicone-containing monomers" and "hydrophilic monomers" include monomers, macromonomers and prepolymers. Prepolymers are partially polymerized monomers or monomers which are capable of further polymerization.

A "silicone-containing monomer" is one that contains at least two [—Si—O—] repeating units, in a monomer, macromer or prepolymer. Preferably, the total Si and attached O are present in the silicone-containing monomer in an amount greater than 20 weight percent, and more preferably greater than 30 weight percent of the total molecular weight of the silicone-containing monomer. The preferred silicone-containing monomers of this invention have the following structure:

Structure I

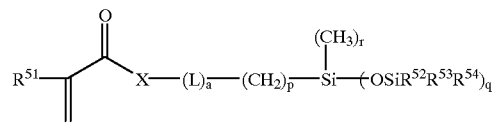

wherein $R^{51}$ is H or $CH_3$, q is 1 or 2 and for each q, $R^{52}$, $R^{53}$ and $R^{54}$ are independently ethyl, methyl, benzyl, phenyl or a monovalent siloxane chain comprising from 1 to 100 repeating Si—O units, p is 1 to 10, r=(3−q), X is O or $NR^{55}$, where $R^{55}$ is H or a monovalent alkyl group with 1 to 4 carbons, a is 0 or 1, and L is a divalent linking group which preferably comprises from 2 to 5 carbons, which may also optionally comprise ether or hydroxyl groups, for example, a polyethylene glycol chain.

Examples of the silicone-containing monomers of Structure I that can be used to form silicone hydrogels of this invention are methacryloxypropylbis(trimethylsiloxy)

methylsilane, methacryloxypropylpentamethyldisiloxane, (3-methacryloxy-2-hydroxypropyloxy) propylbis (trimethylsiloxy)methylsilane. Preferred silicone-containing monomers are monomethacryloxyalkyl terminated polydimethylsiloxanes ("mPDMS") such as those shown in structure II.

Structure II

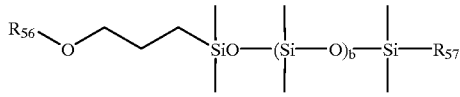

where b=0 to 100, and $R_{57}$ is any $C_{1-10}$ aliphatic or aromatic group which may include hetero atoms; provided that $R_{57}$ is not functionalized at the point at which it is bonded to Si. $C_{3-8}$ alkyl groups are preferred with butyl groups, particularly sec-butyl groups, being most preferred. $R_{56}$ is an ethylenically unsaturated moiety; prefereably a single polymerizable vinyl group. More preferably it is a methacryl moiety but it can also be an acryl or styrenic moiety or other similar moiety.

It is preferred that additional silicone-containing monomers are combined with the silicone-containing monomers of Stucture I to form the soft contact lenses of the invention. Methacryloxypropyltris(trimethylsiloxy)silane (TRIS), amide analogs of TRIS described in U.S. Pat. No. 4,711,943, and the vinylcarbamate or carbonate analogs described in U.S. Pat. No. 5,070,215 are also suitable for use in this regard Indeed, any known silicone-containing monomer useful for making silicone hydrogels can be used in combination with the silicone-containing monomer of Strucure I to form the soft contact lenses of this invention. Many silicone-containing monomers useful for this purpose are disclosed in U.S. patent application Ser. No. 08/948,128 filed Oct. 9, 1997, incorporated herein by reference. Some examples of other monomers that can be combined with the silicone-containing monomers of Structure I to form the silicone hydrogels of this invention are the hydroxyalkylamine-functional silicone-containing monomers disclosed in U.S. Ser. No. 09/033,348 titled Silicone Hydrogel Polymers by Vanderlaan et al. filed Mar. 2, 1998, and incorporated herein by reference. Linear or branched hydroxyalkylamine-functional monomers comprising a block or random monomer of the following structures can be used:

Structure III

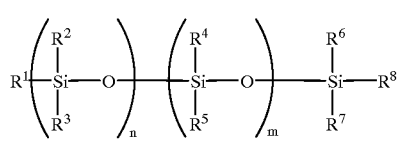

wherein:
n is 0 to 500 and m is 0 to 500 and (n+m)=10 to 500 and more preferably 20 to 250;

$R^2$, $R^4$, $R^5$, $R^6$ and $R^7$ are independently a monovalent alkyl, or aryl group, which may be further substituted with alcohol, ester, amine, ketone, carboxylic acid or ether groups, preferably unsubstituted monovalent alkyl or aryl groups; and $R^1$, $R^3$ and $R^8$ are independently a monovalent alkyl, or aryl group, which may be further substituted with an alcohol, ester, amine, ketone, carboxylic acid or ether group, preferably unsubstituted monovalent alkyl or aryl groups, or are the following nitrogen-containing structure:

Structure IV

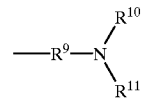

with the proviso that at least one of $R^1$, $R^3$, and $R^8$ are according to Structure IV, wherein $R^9$ is a divalent alkyl group such as $-(CH_2)_s-$ where s is from 1 to 10, preferably 3 to 6 and most preferably 3;

$R^{10}$ and $R^{11}$ are independently H, a monovalent alkyl or aryl group which may be further substituted with an alcohol, ester, amine, ketone, carboxylic acid or ether group, or has the following structure:

Structure V

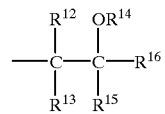

where $R^{14}$, is H, or a monovalent polymerizable group comprising acryloyl, methacryloyl, styryl, vinyl, allyl or N-vinyl lactam, preferably H or methacryloyl; $R^{16}$ is either H, a monovalent alkyl or aryl group which can be further substituted with alcohol, ester, amine, ketone, carboxylic acid or ether groups, or a polymerizable group comprising acrylate, methacrylate, styryl, vinyl, allyl or N-vinyl lactam, preferably alkyl substituted with an alcohol or methacrylate; $R^{12}$, $R^{13}$ and $R^{15}$ are independently H, a monovalent alkyl or aryl, which can be further substituted with alcohol, ester, amine, ketone, carboxylic acid or ether groups, or $R^{12}$ and $R^{15}$, or $R^{15}$ and $R^{13}$ can be bonded together to form a ring structure, with the proviso that at least some of the Structure IV groups on the monomer comprises polymerizable groups. $R^{12}$, $R^{13}$ and $R^{15}$ are preferably H.

In alternative embodiments, the silicone hydrogels of this invention may also comprise hydrophilic monomers. The hydrophilic monomers optionally used to make the hydrogel polymer of this invention can be any of the known hydrophilic monomers disclosed in the prior art to make hydrogels. Preferred hydrophilic monomers used in such embodiments are either acrylic- or vinyl-containing. Such hydrophilic monomers may themselves be used as crosslinking agents. The term "vinyl-type" or "vinyl-containing" monomers refer to monomers containing the vinyl grouping ($-CH=CH_2$) and are generally highly reactive. Such hydrophilic vinyl-containing monomers are known to polymerize relatively easily. "Acrylic-type" or "acrylic-containing" monomers are those monomers containing the acrylic group: ($CH_2=CRCOX$) wherein R is H or $CH_3$, and X is O or N, which are also known to polymerize readily, such as N,N-dimethyl acrylamide (DMA), 2-hydroxyethyl methacrylate (HEMA), glycerol methacrylate, 2-hydroxyethyl methacrylamide, polyethyleneglycol monomethacrylate, methacrylic acid and acrylic acid.

Hydrophilic vinyl-containing monomers which may be incorporated into the silicone hydrogels of the present invention include monomers such as N-vinyl lactams (e.g. N-vinyl pyrrolidone (NVP), N-vinyl-N-methyl acetamide, N-vinyl-N-ethyl acetamide, N-vinyl-N-ethyl formamide, N-vinyl formamide), with NVP being preferred.

Other hydrophilic monomers that can be employed in the invention include polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, the hydrophilic oxazolone monomers disclosed in U.S. Pat. No. 4,910,277, and polydextran. Other suitable hydrophilic monomers will be apparent to one skilled in the art.

More preferred hydrophilic monomers which may be incorporated into the polymer of the present invention include hydrophilic monomers such as N,N-dimethyl acrylamide (DMA), 2-hydroxyethyl methacrylate (HEMA), glycerol methacrylate, 2-hydroxyethyl methacrylamide, N-vinylpyrrolidone (NVP), polyethyleneglycol monomethacrylate, methacrylic acid and acrylic acid with DMA being the most preferred.

Other monomers that can be present in the reaction mixture used to form the silicone hydrogel of this invention include ultra-violet absorbing monomers, reactive tints and the like. Additional processing aids such as release agents or wetting agents can also be added to the reaction mixture.

The polymer mix used to form the lenses of this invention include one or more high molecular weight hydrophilic polymers in addition to the hydrophilic monomers identified above. The hydrophilic polymers act as internal wetting agents. That is, they imbue the hydrogels into which they are incorporated with greatly improved wettability. Preferentially, this occurs to an extent such that hydrophobic hydrogels that would ordinarily require a hydrophilic coating for good physiological compatibility with, for example, the surface of the eye. However, a hydrophilic coating such as polyacrylic acid may still be applied to the surface of the hydrogel if desired. When this is done, the hydrogel incorporating the wetting agent in it improves the physiological compatibility of the hydrogel (relative to a coated lens without the instant wetting agent) by reducing contact between tissue and hydrophobic domains within the hydrogel.

The hydrophilic polymers useful as internal wetting agents are polyamides, polylactams, polyimides and polylactones. Preferably, they are hydrogen bond receivers which in aqueous environments, hydrogen bond to water, thus becoming effectively more hydrophilic. In any events incorporation of the hydrophilic polymer in the hydrophobic hydrogel matrix without the presence of water facilitates compatibility with hydrophobic polymers such as silicones. Upon subsequent contact with water (i.e., hydration) they render the silicones wettable.

Preferably these hydrophilic polymeric wetting agents are linear polymers having a cyclic moiety incorporated into the polymer backbone. This cyclic moiety is even more preferably a cyclic amide or imide cyclic moiety. This class of polymers preferably includes for example, polyvinylpyrrolidone and polyvinylimidazole but polymers such as polydimethylacrylamide are also useful in this capacity. Polyvinylpyrrolidone is the most preferred hydrophilic polymeric wetting agent.

Hydrophilic polymers useful as wetting agents in this invention have high average molecular weights (Mw's of no less than 50,000 daltons and preferably 100,000 to 500,000 daltons). More preferred molecular weight ranges are 300,000 to 400,000 with a range of 320,000 to 370,000 being most preferred Molecular weights of hydrophilic polymers can also be expressed by the so-called K-value, based on kinematic viscosity measurements, as described in N-Vinyl Amide Polymers by E. S. Barabas in Encyclopedia of Polymer Science and Engineering, Second edition, Vol. 17, pp 198–257, John Wiley & Sons, Inc. Expressed in this manner, hydrophilic polymers with K-values of 46 to 100 are preferred. Hydrophilic polymers are employed in amounts such that about 1–15% wt of the wetting agent (e.g., PVP) is present in the final hydrogel formulation. Preferably, 3–8% will be present in the final hydrogel formulation. Such polymers, when prepared as part of the hydrogel matrix in the manner described herein, are incorporated into the hydrogel formulation of this invention without significant covalent bonding to the hydrogel. The absence of significant covalent bonding means that while a minor degree of covalent bonding may be present, it is incidental to the retention of the wetting agent in the hydrogel matrix. Whatever incidental covalent bonding may be present, it would not by itself be sufficient to retain the wetting agent in the hydrogel matrix. Instead, the vastly predominating effect keeping the wetting agent associated with the hydrogel is entrapment. The polymer is "entrapped", according to this specification, when it is physically retained within a hydrogel matrix. This is done via entanglement of the polymer chain of the wetting agent within the hydrogel polymer matrix However, van der Waals forces, dipole-dipole interactions, electrostatic attraction and hydrogen bonding can also contribute to this entrapment to a lesser extent.

The hydrogels of this invention are best made by the preparation of a macromer and polymerization of this macromer with other components of a monomer mix. "Macromer", as the term is used in this specification, refers to a prepolymer formed by Group Transfer Polymerization (GTP) of one or more siloxanes with one or more acrylic or methacrylic materials. The methacrylates or acrylates useful in this capacity are capable of contributing hydroxyl moieties to the overall macromer formulation. Thus, methyl methacrylate, while beneficial to the overall formulation of macromer is not as the sole (meth)acrylate component, itself sufficient to form the macromer of this invention. However, its presence together with a hydroxy methacrylate would be sufficient as the (meth)acrylate component(s). The preferred macromers of this invention are the GTP reaction products of hydroxy methacrylates or acrylates, trimethylsiloxanes, and polydimethylsiloxanes. More preferably, the macromer is the GTP reaction product of 2-hydroxyethyl methacrylate (HEMA), methyl methacrylate (MMA), methacryloxypropyltris(trimethylsiloxy)silane (TRIS), and mono-methacryloxypropyl terminated mono-butyl terminated polydimethylsiloxane (mPDMS). Most preferably, 18–21 (even more preferably about 19.1) moles HEMA is combined with about 2–3 (even more preferably about 2.8) moles MMA, about 7–9 (even more preferably about 7.9) moles TRIS, and 2.5–4.5 (even more preferably about 3.3 moles) mPDMS. The GTP formation of macromer is completed by reacting the aforementioned combination of materials with 2.0 moles per mole of 3-isopropenyl-$\alpha,\alpha$-dimethylbenzyl isocyanate using dibutyltin dilaurate as a catalyst. This reaction is typically conducted at about 60–120° C. for about 2–10 hours.

The hydrogel is prepared by reacting the following reaction mixture (sometimes referred to as the "monomer mix"): macromer; silicone containing monomers, optional hydrophilic polymers (other than the wetting agent) crosslinking agents, and high molecular weight hydrophilic polymer (wetting agent). The monomer mix is reacted in the absence of water and in the optional presence of an organic diluent. The hydrogel is completed by hydration of the reaction product of this reaction mixture. Preferably, the siloxanes comprise $Si_{7-9}$ monomethacryloxy terminated polydimethyl siloxane and trimethylsiloxy silanes. More preferably, the monomer mix is comprised of macromer, $Si_{7-9}$ monomethacryloxy terminated polydimethyl siloxane; methacryloxypropyl tris(trimethylsiloxy)silane, "TRIS"; dimethyl amide, "DMA"; hydroxyethyl methacrylic acid, "HEMA"; triethyleneglycoldimethacrylate, "TEGDMA", polyvinylpyrrolidone, "PVP"; additives and photoinitiators.

The preferred range of the combined silicone-containing monomers is from about 5 to 100 weight percent, more preferably about 10 to 90 weight percent, and most preferably about 15 to 80 weight percent of the reactive components in the reaction mixture (monomer mix plus macromer). The preferred range of optional hydrophilic monomer if present in the above invention is from about 5 to 80 weight percent, more preferably about 10 to 60 weight percent, and most preferably about 20 to 50 weight percent of the reactive components in the reaction mixture. The preferred range of high molecular weight hydrophilic polymer (wetting agent) is 1 to 15 weight percent, more preferably 3 to 10 weight percent, and most preferably 5 to 8 weight percent. The preferred range of diluent is from about 0 to 70 weight percent, more preferably about 0 to 50 weight percent, and most preferably about 0 to 20 weight percent of the total reaction mixture. The amount of diluent required varies depending on the nature and relative amounts of the reactive components.

Most preferably, the reaction mixture comprises the most preferred macromer (described above); $Si_{7-9}$ monomethacryloxy terminated polydimethyl siloxane (~28%wt); methacryloxypropyl tris(trimethyl siloxy) silane, "TRIS" (~14%wt); dimethyl amide, "DMA" (~26 %wt); hydroxy ethyl methacrylic acid, "HEMA" (~5%); triethyleneglycoldimethacrylate, "TEGDMA" (~1%), polyvinylpyrrolidone, "PVP" (~5%); with the balance comprising minor amounts of additives and photoinitiators. The polymerization is most preferably conducted in the presence of 20% (weight % of the complete monomer and diluent blend) dimethyl-3-octanol diluent.

A polymerization catalyst is preferably included in the reaction mixture. The polymerization catalyst can be a compound such as lauroyl peroxide, benzoyl peroxide, isopropyl percarbonate, azobisisobutyronitrile, or the like, that generates free radicals at moderately elevated temperatures, or the polymerization catalyst can be a photoinitiator system such as an aromatic alpha-hydroxy ketone or a tertiary amine plus a diketone. Illustrative examples of photoinitiator systems are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DNMBAPO), and a combination of camphorquinone and ethyl 4-(N,N-dimethylamino)benzoate. The catalyst is used in the reaction mixture in catalytically effective amounts, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. Alternatively, initiation can be conducted without a photoinitiator using, for example, low voltage e-beam. However, when a photoinitiator is used, the preferred initiator is a combination of 1-hydroxycyclohexyl phenyl ketone and bis(2,6-dimethoxybenzoyl)-2,4-4-trimethylpentyl phosphine oxide (DMBAPO), and the preferred method of polymerization initiation is visible light.

Typically after curing the reaction mixture, the resulting polymer is treated with a solvent to remove the diluent (if used) or any traces of unreacted components, and hydrate the polymer to form the hydrogel. The solvent used may be water (or an aqueous solution such as physiological saline), or depending on the solubility characteristics of the diluent (if used) used to make the hydrogel of this invention and the solubility characteristics of any residual unpolymerized monomers, the solvent initially used can be an organic liquid such as ethanol, methanol, isopropanol, mixtures thereof, or the like, or a mixture of one or more such organic liquids with water, followed by extraction with pure water (or physiological saline) to produce the silicone hydrogel comprising a polymer of said monomers swollen with water. The silicone hydrogels after hydration of the polymers preferably comprise 10 to 55 weight percent water, more preferably 20 to 50 weight percent water, and most preferably 25 to 45 weight percent water of the total weight of the silicone hydrogel. These silicone hydrogels are particularly suited for making contact lenses or intraocular lenses, preferably soft contact lenses.

Various processes are known for molding the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. The preferred method for producing contact lenses comprising the polymer of this invention is by the direct molding of the silicone hydrogels, which is economical, and enables precise control over the final shape of the hydrated lens. For this method, the reaction mixture is placed in a mold having the shape of the final desired silicone hydrogel, to thereby produce a polymer in the approximate shape of the final desired product. Then, this polymer mixture is optionally treated with a solvent and then water, producing a silicone hydrogel having a final size and shape that are quite similar to the size and shape of the original molded polymer article. This method can be used to form contact lenses and is further described in U.S. Pat. Nos. 4,495,313; 4,680,336; 4,889,664; and 5,039,459, incorporated herein by reference. After producing the silicone hydrogel, the lens may be coated with a hydrophilic coating if desired. Some methods of adding hydrophilic coatings to a lens have been disclosed in the prior art, including U.S. Pat. Nos. 3,854,982, 3,916,033, 4,920,184 and 5,002,794; WO 91/04283, and EPO 93810399.

The reaction mixtures of the present invention can be formed by any of the methods known to those skilled in the art, such as shaking or stirring, and used to form polymeric articles or devices by the methods described earlier. For some monomer reaction mixtures it is preferred to polymerize the reaction mixtures at temperatures slightly above room temperature, such as 30–40° C., or even as high as 80° C., or below room temperature, such as 0–10° C., so as to prevent phase separation of the components.

Silicone hydrogels of the instant invention have high oxygen permeability. They have $O_2$ Dk values between 40 and 300 barrer determined by the polarographic methods. Polarographic method measurements of oxygen permeability are made as follows. Lenses are positioned on the sensor then covered on the upper side with a mesh support. The oxygen that diffuses through the lens is measured using a polarographic oxygen sensor consisting of a 4 mm diameter gold cathode and a silver ring anode. The reference values are those measured on commercially available contact lenses using this method. Balafilcon A lenses available from Bausch & Lomb give a measurement of approx. 79 barrer. Etafilcon lenses give a measurement of 20 to 25 barrer.

In the examples the following abbreviations are used:

TRIS 3-methacryloxypropyltris(trimethylsiloxy)silane
DMA N,N-dimethylacrylamide
THF tetrahydrofuran
TMI dimethyl meta-isopropenyl benzyl isocyanate
HEMA 2-hydroxyethyl methacrylate
MMA methyl methacrylate
TBACB tetrabutyl ammonium-m-chlorobenzoate
mPDMS 800–1000 MW monomethacryloxypropyl terminated polydimethylsiloxane
3M3P 3-methyl-3-propanol
Norbloc 2-(2'-hydroxy-5-methacrylyloxyethylphenyl)-2H-benzotriazole
CGI 1850 1:1 (wgt) blend of 1-hydroxycyclohexyl phenyl ketone and bis(2,6-dimethoxybenzoyl)2,4-4-trimethylpentyl phosphine oxide
PVP poly(N-vinyl pyrrolidone)
IPA isopropyl alcohol

EXAMPLE 1

Macromer Formation

To a solution of 13.75 ml of a 1M solution of TBACB in THF, 30.0 g bis(dimethylamino)methylsilane, 61.39 g p-xylene, 154.28 g methyl methacrylate, and 1892.13 g 2-(trimethylsiloxy)ethyl methacrylate in 4399.78 g THF at 14° C., under a $N_2$ atmosphere, was added 191.75 g of 1-trimethylsiloxy-1-methoxy-2-methylpropene. 30 ml of additional TBACB in THF (0.40 M) was added over a period of 260 minutes, during which time the reaction mixture was allowed to exotherm, and then cooled to 30° C. Sixty minutes after addition of 2-(trimethylsiloxy)ethyl methacrylate, a solution of 467.56 g 2-(trimethylsiloxy)ethyl methacrylate, 3636.6 g mPDMS and 3673.84 g TRIS and 20.0 g bis(dimethylamino)methylsilane was added, and the mixture was allowed to exotherm and then cooled to 30° C. for 2 hours. A solution of 110.0 g. bis(dimethylamino) methylsilane, 154.26 g methyl methacrylate, and 1892.13 g 2-(trimethylsiloxy)ethyl methacrylate was then added and the mixture was again allowed to exotherm. After 2 hours, 2 gallons of anhydrous THF was added, followed by a solution of 439.69 g water, 740.6 g methanol and 8.8 g dichloroacetic acid after the solution was allowed to cool down to 34° C. The mixture was refluxed for 4.5 hours, heating with an oil bath at 110° C., and volatiles were distilled off at 135° C., with addition of toluene to aid in removal of water, until a vapor temperature of 110° C. is reached.

The reaction flask was cooled to 110° C., and a solution of 443 g TMI and 5.7 g dibutyltin dilaurate was added. The mixture was reacted for 3.5 hours, then cooled to 30° C. The toluene was evaporated under reduced pressure to yield off-white, anhydrous, waxy, reactive macromer. The theoretical OH content of the macromer is 1.69 mmol/g.

EXAMPLES 2–14

Contact lenses were made from blends of the macromer from Example 1, and other components as indicated in Table 1, curing under visible light at 75° C. (All component amounts are given as weight % of reactive components, except diluent, which is given as weight percent of the final monomer-diluent blend). The PVP that was used is sold as "POLYVINYLPYRROLIDONE (PVP K90)" by ICN Biomedicals, Inc. After curing, the molds were opened, and the lenses were released into a 1:1 blend of water and ethanol, then leached in ethanol to remove any residual monomers and diluent. Finally the lenses were equilibrated in physiological borate-buffered saline.

TABLE 1

|  | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|
| Macromer | 24 | 25 | 25 | 25 | 21 | 25 | 25 | 25 | 25 | 19 | 25 | 25 | 25 |
| TRIS | 20 | 17 | 17 | 18 | 20 | 18 | 19 | 19.5 | 19.75 | 20 | 17 | 17 | 17 |
| DMA | 33 | 32 | 30 | 28 | 28 | 32 | 32 | 32 | 32 | 37 | 30 | 30 | 30 |
| mPDMS | 20 | 17 | 17 | 18 | 20 | 18 | 19 | 19.5 | 19.75 | 20 | 17 | 17 | 17 |
| Norbloc | 2 | 2 | 2 | 2 | 2 | 2 | 2 | 2 | 2 | 2 | 2 | 2 | 2 |
| CGI 1850 | 1 | 1 | 1 | 1 | 1 | 1 | 1 | 1 | 1 | 1 | 1 | 1 | 1 |
| PVP | 0 | 6 | 8 | 8 | 8 | 4 | 2 | 1 | 0.5 | 1 | 8 | 8 | 8 |
| % Diluent (3M3P) | 20 | 20 | 20 | 20 | 20 | 20 | 20 | 20 | 20 | 20 | 20 | 25 | 30 |
| % EWC[1] | 34.5 | 50.2 | 48.6 | 48.5 | 46.8 | 44.1 | 41.3 | 38.3 | 38.0 | 42.7 | 48.6 | 53.0 | 51.1 |
| Std Dev | 0.3 | 0.3 | 0.2 | 0.2 | 0.3 | 0.1 | 0.3 | 0.2 | 0.2 | 0.1 | 0.2 | 0.2 | 0.3 |
| Modulus | 76 | 59 | 59 | 59 | 49 | 60 | 66 | 77 | 76 | 63 | 59 | 56 | 53 |
| Std Dev | 4 | 3 | 7 | 11 | 11 | 3 | 4 | 2 | 4 | 3 | 7 | 5 | 4 |
| % Elong. at break | 332 | 244 | 220 | 261 | 289 | 283 | 295 | 280 | 309 | 325 | 220 | 253 | 264 |
| Std Dev | 38 | 48 | 71 | 48 | 50 | 69 | 35 | 52 | 39 | 22 | 71 | 46 | 41 |
| Dk ec[2] | 112.3 | 76.0 | 75.9 | 97.9 | 107.8 | 95.8 | 99.8 | 92.3 | 94.1 | 81.2 | 75.9 | 80.5 | 89.0 |
| Dk[3] | 139.8 | 98.2 | 99.1 | 133.3 | 138.8 | 123.5 | 126.0 | 114.9 | 114.9 | 98.3 | 99.1 | 102.6 | 113.0 |
| DCA[4] |  |  |  |  |  |  |  |  |  |  |  |  |  |
| Advancing | 125 | 71 | 58 | 53 | 59 | 55 | 100 | 127 | 117 | 139 | 58 | 61 | 69 |
| Std Dev | 14 | 18 | 8 | 15 | 8 | 7 | 19 | 17 | 6 | 5 | 8 | 13 | 12 |
| Receding | 40 | 40 | 40 | 36 | 38 | 45 | 43 | 33 | 46 | 37 | 40 | 38 | 39 |
| Std Dev | 7 | 5 | 7 | 5 | 3 | 3 | 6 | 9 | 3 | 7 | 7 | 3 | 5 |
| Lipid Uptake |  |  |  |  |  |  |  |  |  |  |  |  |  |
| Conc. | 7.93 | 3.55 | 2.85 | 3.345 | 4.165 | 3.26 | 4.245 | 6.485 | 7.015 | 5.81 | 2.85 | 3.785 | 2.83 |
| Std Dev | 0.46 | 0.42 | 0.41 | 0.11 | 0.85 | 0.54 | 0.355 | 0.63 | 0.335 | 0.2 | 0.41 | 0.365 | 0.24 |

EXAMPLE 15

Wettability

Lenses were made from a blend of 8% (by weight) PVP (K90 from ICN Biomedicals, Inc.), 20% macromer from Example 1, 28.5% mPDMS, 8.0% TRIS, 5.0% HEMA, 26% DMA, 1.5% TEGDMA, 2.0% Norbloc and 1.0% CGI 1850, in a blend with 37.5% (based on total monomer/diluent blend) 3M3P as diluent, following the procedure of example 2. The lenses were worn in a clinical study and found to be wettable and comfortable. The above lenses (n=10 eyes) were compared to an ACUVUE® (n=12 eyes) historical control and found to be 100% wettable (no non-wetting spots seen while worn); similar with respect to pre-lens tear film noninvasive tear break-up time (PLTF-NIBUT) 7.1±2.7 vs. ACUVUE® 12.7±4.7; and comfortable on a 50-point scale 44.3±4.5 vs. ACUVUE® 46.8±2.8.

EXAMPLE 16

(Comparative)—Extraction of K-value 29–32 PVP

Contact lenses were made following the procedure of Example 2, from a blend of 20% (weight) 40,000 $M_w$ PVP (from Sigma Chemicals, ave. mol. wgt. 10,000, K value (intrinsic viscosity) 29–32), 12% macromer from Example 1, 20% TRIS, 39% HEMA, 5% DMA, 3% TEGDMA, and 1% DAROCUR 1173, in a blend with 50% (based on total monomer/diluent blend) hexanol as diluent, except that lenses were removed from the molds without initial extraction. Each lens was weighed and extracted in 5.0 ml of water or methanol, analyzing the extracts as a function of time. The results, in Table 2, illustrate that relatively low molecular weight PVP diffuses out of the polymer matrix in methanol. Approximately all of the PVP was gone after two hours. In water however, the PVP was not completely lost from the lens matrix. The diffusion reached a plateau after 24 hours, where no farther release of PVP was observed.

Lenses that were leached in methanol were placed into borate buffered saline. The dynamic contact angles of these lens with borate buffered saline were 104° advancing, and 41° receding, also illustrating that this relatively low molecular weight PVP is not sufficiently retained in the polymer matrix to survive alcohol extraction.

TABLE 2

Extraction of K-value 29–32 PVP
Extraction of PVP with sonication (% of total)*

| Time (hr) | In MeOH | In Water |
| --- | --- | --- |
| 0.25 | 71 | 14 |
| 0.50 | 78 | 16 |
| 1.00 | 87 | 29 |
| 1.50 | 95 | 35 |
| 2.00 | 93 | 41 |
| 3.00 | 108 | 51 |
| 18.00 | 114 | 72 |
| 24.00 | 114 | 82 |
| 27.50 | 106 | 80 |
| 43.00 | 114 | 79 |
| 48.00 | 107 | 80 |

*Values can exceed >100% due to normal experimental variability for this test.

EXAMPLE 17

Extraction of K-value 80–100 PVP

Contact lenses were made following the procedure of Example 2, from a blend of 8% (weight) 360,000 $M_w$ PVP (from Sigma Chemicals, ave. mol. wgt. 360,000, K value (intrinsic viscosity) 80–100), 20% macromer from Example 1, 35% mPDMS, 5% HEMA, 26% DMA, 2% TEGDMA, 2% Norbloc and 2% CGI 1850, in a blend with 35% (based on total monomer/diluent blend) 3M3P as diluent, except that lenses were removed from the molds without initial extraction. Each lens was weighed and extracted in 10.0 ml of water or IPA, analyzing the extracts as a function of time. The results, in Table 3, illustrate that this higher molecular weight PVP is mostly retained in the lens, even after extraction with aggressive organic solvents.

TABLE 3

Extraction of K-value 80–100 PVP
Extraction of PVP with sonication (% of total)*

| Time (hr) | In IPA | In Water |
| --- | --- | --- |
| 0.17 | 14 | 17 |
| 0.33 | 20 | 21 |
| 0.58 | 13 | 21 |
| 0.92 | 20 | 21 |
| 1.08 | 23 | 21 |
| 1.5 | 21 | 22 |
| 2.00 | 22 | 23 |
| 2.50 | 21 | 23 |
| 3.00 | 20 | 23 |

EXAMPLE 17

Dust Adhesion Assay, Ease of Processability

Lenses were made from a blend of 5% (weight) PVP (from Sigma Chemicals, ave. mol. wgt. 360,000, K value (intrinsic viscosity) 80–100), 18% macromer from Example 1, 28% mPDMS, 14% TRIS, 5% HEMA, 26% DMA, 1% TEGDMA, 2% Norbloc and 1% CGI 1850, in a blend with 20% (based on total monomer/diluent blend) 3,7-dimethyl-3-octanol as diluent, following the procedure of example 2. One of these lenses was shaken in a dispersion of household dust in borate buffered saline, cleaned by a 10 second digital rub, and examined under a comparator. The amount of dust adhered to the surface was about 25% or less of that adhered to a similarly treated lens made without PVP. In addition it was observed that lenses made with PVP were much less sticky to other lenses and to glass and plastic surfaces, thus making them easier to handle during processing.

We claim:

1. A wettable silicone hydrogel comprising the reaction product of
   (a) a silicone hydrogel monomer mix, and
   (b) a high molecular weight hydrophilic polymer wherein said hydrophilic polymer is entrapped in said silicone hydrogel.

2. The hydrogel of claim 1 wherein said hydrophilic polymer is a homopolymer.

3. The hydrogel of claim 1 wherein said hydrophilic polymer is a copolymer made from the combination of at least two different monomers.

4. The hydrogel of claim 1 wherein said hydrophilic polymer is selected from the group consisting of polyamides, polylactams, polyimides, polylactones, and polydextrans.

5. The hydrogel of claim 1 wherein said hydrophilic polymer incorporates a cyclic moiety throughout its backbone.

6. The hydrogel of claim 1 wherein said hydrophilic polymer is polyvinylpyrrolidone.

7. The hydrogel of claim 6 wherein said polyvinylpyrrolidone has a number average molecular weight greater than about 50,000.

8. The hydrogel of claim 6 wherein said polyvinylpyrrolidone has a number average molecular weight greater than about 80,000.

9. The hydrogel of claim 4 wherein said polyvinylpyrrolidone has a number average molecular weight greater than 100,000.

10. An ophthalmic lens prepared by adding a high molecular weight hydrophilic polymer to a silicone hydrogel monomer mix and said hydrophilic polymer is entrapped in the hydrogel formed from said silicone hydrogel monomer mix.

11. The ophthalmic lens of claim 10 wherein said monomer mix comprises a macromer having hydroxyl content.

12. The ophthalmic lens of claim 10 wherein said hydrophilic polymer is a homopolymer.

13. The ophthalmic lens of claim 10 wherein said hydrophilic polymer is a copolymer made from a combination of at least two different monomers.

14. The ophthalmic lens claim 10 wherein said hydrophilic polymer is selected from the group consisting of polyamides, polylactams, polymides, polylactones, and polydextrans.

15. The ophthalmic lens of claim 14 wherein said hydrophilic polymer is polyvinylpyrrolidone.

16. The ophthalmic lens of claim 15 wherein said polyvinylpyrrolidone has a weight average molecular weight of at least 50,000.

17. The ophthalmic lens of claim 15 wherein said polyvinylpyrrolidone has a weight average molecular weight of at least 80,000.

18. The ophthalmic lens of claim 15 wherein said polyvinylpyrrolidone has a weight average molecular weight of at least 100,000.

19. A method of making a silicone hydrogel comprising:
a) combining a silicone hydrogel monomer mix with a high molecular weight hydrophilic polymer under polymerization conditions, and
b) recovering a silicone hydrogel with said hydrophilic polymer entrapped therein.

20. The method of claim 19 wherein said monomer mix comprises a macromer having hydroxyl content.

21. The method of claim 19 wherein said hydrophilic polymer is a homopolymer.

22. The method of claim 19 wherein said hydrophilic polymer is a copolymer made from the combination of at least two different monomers.

23. The method of claim 19 wherein said hydrophilic polymer is selected from the group consisting of polyamides, polylactams, polyimides, polylactones, and polydextrans.

24. The method of claim 23 wherein said hydrophilic polymer is a polyvinylpyrrolidone.

25. The method of claim 24 wherein said polyvinylpyrrolidone has an average molecular weight of at least about 50,000.

26. The method of claim 24 wherein said polyvinylpyrrolidone has an average molecular weight of at least about 80,000.

27. The method of claim 24 wherein said polyvinylpyrrolidone has an average molecular weight of at least about 100,000.

28. An article made from the process of claim 19.

29. An ophthalmic lens made from process of claim 19.

30. The silicone hydrogel of claim 1 wherein said silicone hydrogel monomer mix comprises
a silicone containing macromer, and
a silicone-containing monomer of Structure I Structure I

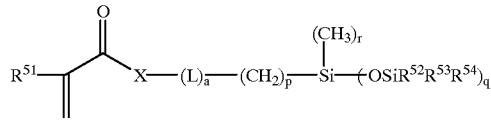

wherein $R^{51}$ is H or $CH_3$, q is 1 or 2 and for each q, $R^{52}$, $R^{53}$ and $R^{54}$ are independently ethyl, methyl, benzyl, phenyl or a monovalent siloxane chain comprising from 1 to 100 repeating Si—O units, p is 1 to 10, r=(3−q), X is O or $NR^{55}$, where $R^{55}$ is H or a monovalent alkyl group with 1 to 4 carbons, a is 0 or 1, and L is a divalent linking group.

31. The silicone hydrogel of claim 1 wherein said silicone hydrogel monomer mix comprises
a silicone containing macromer, and
a silicone-containing monomer of Structure II Structure II

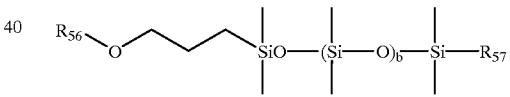

where b=0 to 100, $R_{57}$ is any $C_{1-10}$ aliphatic or aromatic group which may include hetero atoms; provided that $R_{57}$ is not functionalized at the point at which it is bonded to Si, and $R_{56}$ is an ethylenically unsaturated moiety.

32. The silicone hydrogel of claim 1 wherein said silicone hydrogel monomer mix comprises monomethacryloxypropyl mono-butyl terminated polydimethylsiloxane.

* * * * *